United States Patent [19]
Vacheron et al.

[11] Patent Number: 6,110,618
[45] Date of Patent: Aug. 29, 2000

[54] BATTERY CELL HOUSING

[75] Inventors: Robert Vacheron, Smyrna; Venus Desai, Lawrenceville, both of Ga.; John C. Byrne, Chicago; Jim Barber, Mundelein, both of Ill.

[73] Assignee: Motorola, Inc., Schaumburg, Ill.

[21] Appl. No.: 09/032,601

[22] Filed: Feb. 27, 1998

[51] Int. Cl.[7] .................................................. H01M 2/02
[52] U.S. Cl. ............................ 429/100; 429/97; 429/99
[58] Field of Search ................................ 429/96, 97, 98, 429/99, 100

[56] References Cited

U.S. PATENT DOCUMENTS

| | | | |
|---|---|---|---|
| 4,599,283 | 7/1986 | Thiele et al. | 429/99 |
| 5,001,772 | 3/1991 | Holcomb et al. | 455/90 |
| 5,693,431 | 12/1997 | Nierescher et al. | 429/97 |

*Primary Examiner*—Carol Chaney
*Attorney, Agent, or Firm*—Philip H. Burrus, IV

[57] ABSTRACT

Described is a two-part housing for a battery cell having circuitry separate from the main body of the cell. Finger joints, blind dado joints, and edge joints with rabbeted edges are disposed in the mating region between the two halves of the housing. An insulating and alignment wall is integral with one half of the housing, and fits in the channel between the main body of the cell and the circuitry. The housing is dimensionally stable, provides mechanical protection for the delicate cell circuitry, and the two halves of the housing may be secured using only a label wrap.

4 Claims, 3 Drawing Sheets

BATTERY CELL HOUSING

TECHNICAL FIELD

This invention relates in general to the field of battery housings.

BACKGROUND OF THE INVENTION

Nearly forty million Americans now use a cellular telephone, and seven million more Americans are expected to subscribe this year. Cellular telephone boutiques and kiosks are appearing in malls throughout the United States, and cellular telephone sales are expected to match or exceed sales of fax machines and video cassette recorders. As the use of cellular telephones increases, users have come to expect greater portability and reliability. A critical aspect of reliability is the durability of the energy system powering the cellular telephone. Advanced energy systems for cellular telephones, such as lithium-ion systems, require delicate circuitry to ensure safe and proper charging and discharging of the energy system. This delicate circuitry requires protection. Therefore, there is a need for an improved housing for a battery cell for a cellular telephone or two-way radio.

DETAILED DESCRIPTION OF THE PREFERRED EMBODIMENT

The present invention is a two-part housing for a battery cell which has circuitry separate from the main body of the cell. The housing includes a top half and a lower half, with edge joints with rabbeted edges and finger joints, and blind dado joints disposed at the mating region of the top half and the lower half, and an insulating wall, joined to one-half of the housing, in the interior of the housing, that fits between the main body of the cell and the cell circuitry. The finger joints and edge joints restrict lateral movement of the two parts of the housing. The insulating and alignment wall shields the delicate cell circuitry from the main body of the cell, protecting the circuitry from impact which could lead to shorting. Thus configured the two parts of the housing are easily put together since only movement in the Z axis is necessary to place the cell in the housing and join the two parts of the housing together. That is to say, the top half of the housing need only be placed on top of the lower half to join the two halves together. Thus, the process of assembly of the housing can easily be automated. Furthermore, the cell and its associated housing make a more durable cell pack because the delicate circuitry is shielded from large movements of the main body of the cell.

Figure 1:
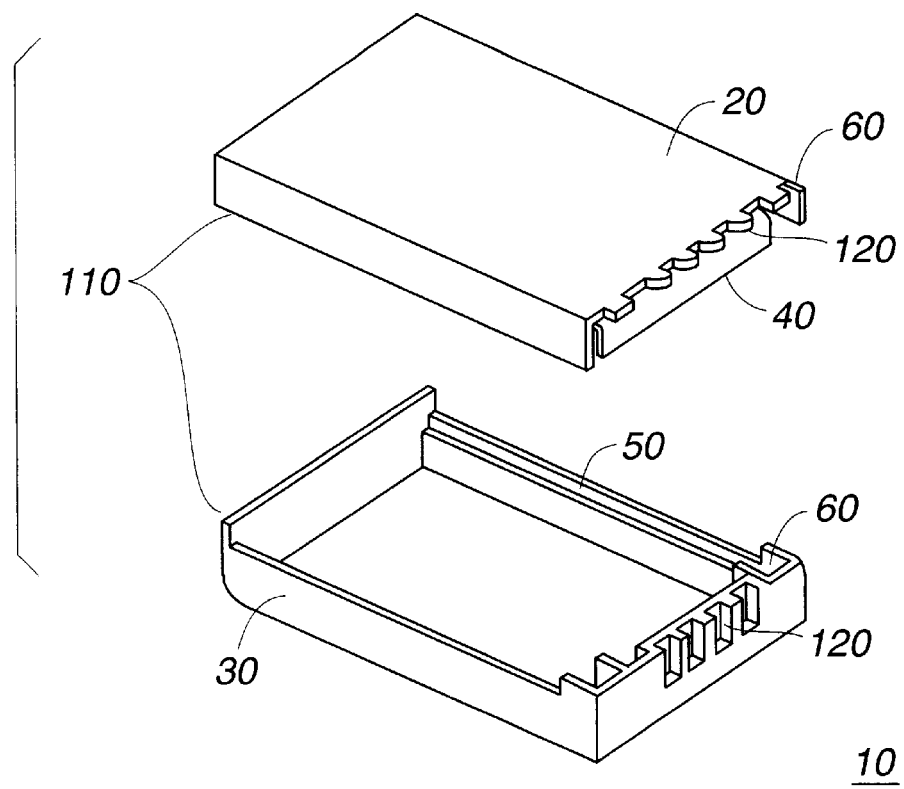
FIG. 1 is a perspective drawing of the two-part housing of the present invention.

FIG. 1 shows the cell housing (10) of the present invention. The cell housing (10) is in two parts, the top half (20) of the housing and the lower half (30) of the housing. Disposed along the mating region (110) of the top half of the housing and the lower half of the housing are edge joints with rabbeted edges (50), and blind dado joints (60), and finger joints (120). In the interior of the housing, (10), shown here joined to the top half of the housing (20), is an insulating and alignment wall (40) which extends in the interior of the cell housing.

Figure 2:
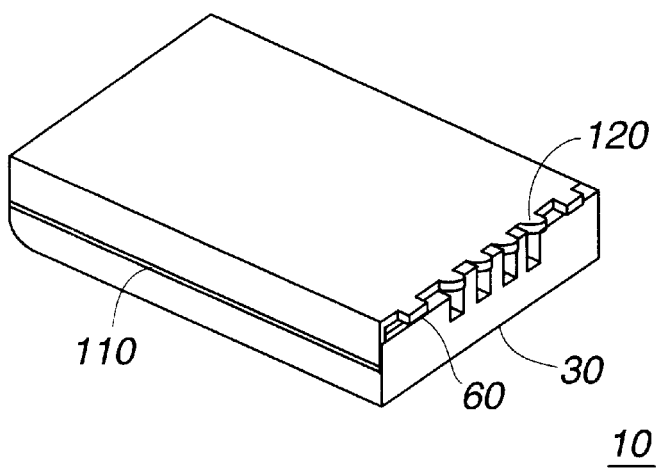
FIG. 2 is a perspective drawing of the battery cell of the present invention showing both halves of the housing mated.
Figure 3:
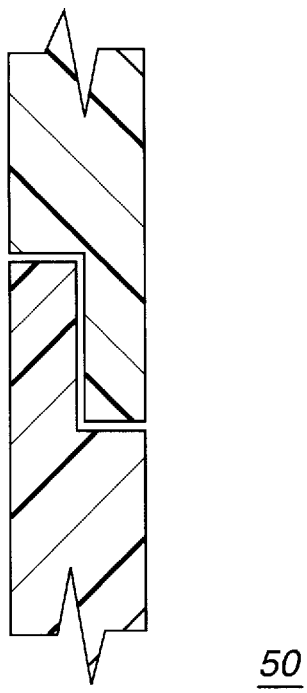
FIG. 3 is a schematic of an edge joint with rabbeted edges.
Figure 4:
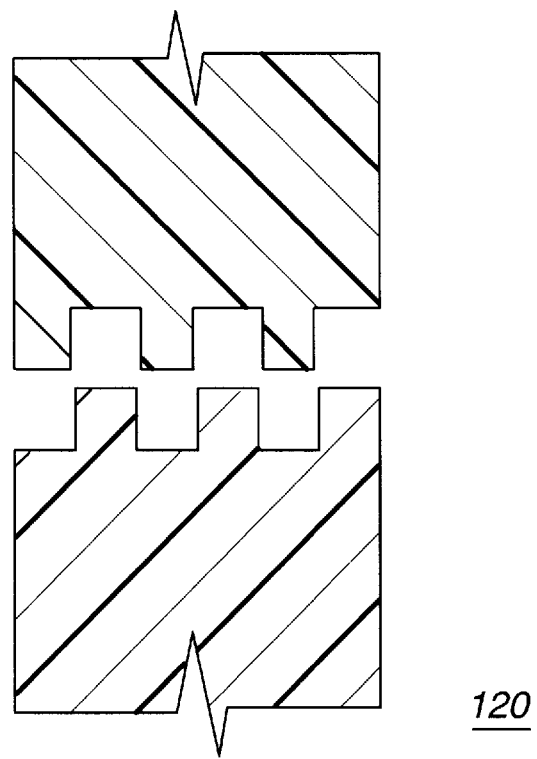
FIG. 4 is a schematic of a finger joint which allows two surfaces to be joined at a right angle then secured.

FIG. 2 shows the cell housing (10) with the top half (20) of the housing mated to the lower half (30) of the housing. Along the mating region (110) of the top half of the housing and lower half of the housing, the edge joint with rabbeted edges (50) and finger joints (120) have mated together. FIG. 3 shows a close-up (50) of an edge joint with rabbeted edges and FIG. 4 shows a close-up of a finger joint (120°), shown on two surfaces which could be joined at right angles with the finger joints interlocking to form a right angle.

Figure 5:
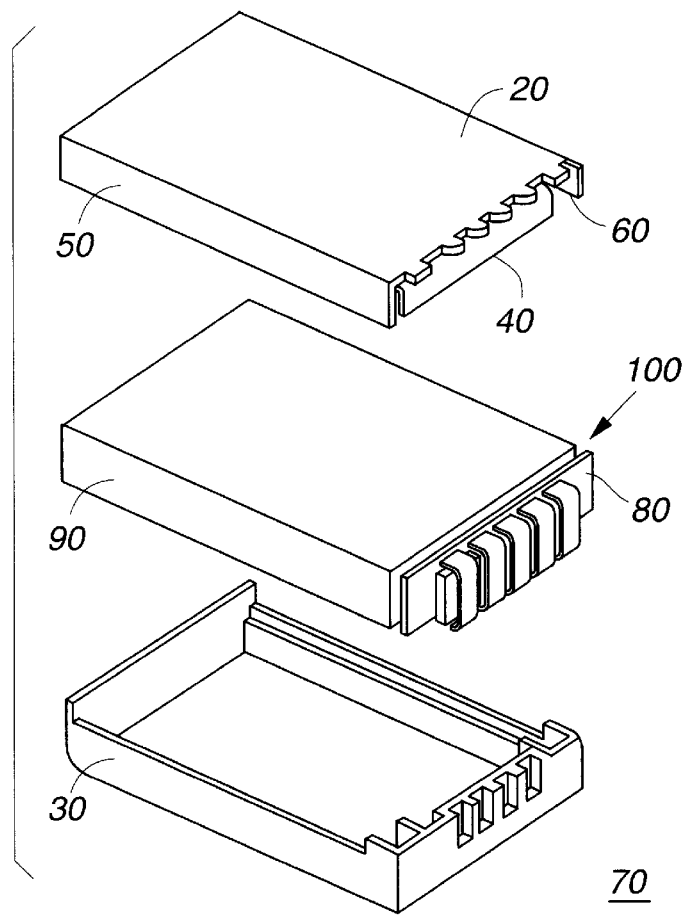
FIG. 5 is a perspective drawing of the top half of the housing of the present invention, and a cell where the circuitry is separated from the main body of the cell.
Figure 6:
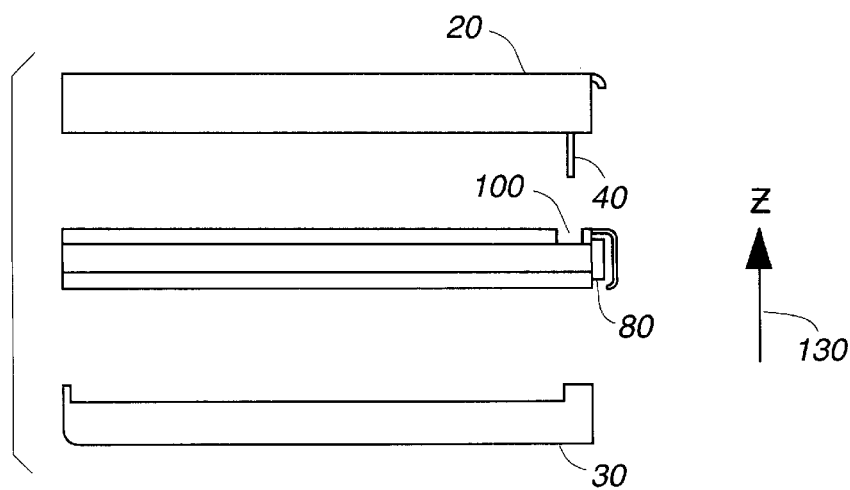
FIG. 6 is an exploded view of the two-part housing of the present invention, with a battery cell with circuitry separate from the main body of the cell, disposed between the top half of the housing and the lower half of the housing.

FIG. 5 shows the top half (20) of the housing and the cell (70) which has circuitry (80) separated from the main body (90) of the cell. This cell (70) could be, for instance, a lithium-ion cell: a cell which requires circuitry for proper and safe charging and discharging. The channel (100) lies between the main body (90) of the cell and the circuitry (80). Not shown is the slender electrical connection between the circuitry (80) and the main body of the cell (90). Insulating and alignment wall (40), here shown on the top half of the housing (20) is fitted to slide into the channel (100) between the main body (90) of the cell and the circuitry (80). FIG. 6 shows the top half of the housing and the lower half (30) of the housing, with a typical cell (70) disposed between them. These components are about to be pressed together along the Z axis (130). Insulation and alignment wall (40) is about to be placed into channel (100) between the main body (90) of the cell and the circuitry (80). When these components are pressed together they will look, to the naked eye, like FIG. 2. Insulating and alignment wall (40) will protect circuitry (80) from mechanical damage from the main body (90) of the cell. As shown by FIG. 6, components can be aligned and assembled simply by pressing in the Z direction. Therefore, this process may be automated. In addition, since the edge joints with rabbeted edges (50), finger joints (120) and blind dado joints (60) permit easy alignments of the top half of the housing and the lower half (30) of the housing, the housing is very stable in the XY (lateral)directions (SEE FIG. 1). Therefore, only a label wrap is needed to secure the top half of the housing to the lower half of the housing. Alternatively, a pressure-sensitive adhesive (not shown) may be placed on the top and bottom of the cell, or in the interior of the housing, to secure the cell. In one embodiment of the invention the mating wall is in two parts with one part joined to the lower half of the housing, and the other point joined to the upper half of the housing.

The housing (10) may be constructed of any suitable durable insulating material, such as plastic, insulated metal, or rubber.

The present housing may be used with any battery cell having circuitry separate from the main body of the cell including cells for use in handheld computers, cellular telephones, two-way radios and other small portable devices.

The present invention will be further understood with reference to the following non-limiting example.

EXAMPLE I

A two-part housing was constructed in accordance with the present invention. The housing was injected molded from plastic. When joined together it measured approximately 57 millimeters by 35 millimeters by 10 millimeters. The insulating wall measured approximately 35 millimeters by 8 millimeters by 0.2 millimeters. The wall was trapezoidal, with the lower base approximately 35 mm long, and the upper base 30 mm long. This wall fitted quite nicely between the circuitry and the main body of the cell of a lithium-ion battery cell placed in the housing. The housing was secured using only a label wrap. Vigorous shaking of the battery cell pack could not unseat the two halves of the battery housing from one another.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A two-part housing for a battery cell, wherein the two parts when joined have a mating region therebetween, having circuitry electrically connected to but physically separate from the cell, comprising:

(a) edge joints disposed in the mating region of the two halves of the housing, the edge joints having rabbeted edges;
   (b) finger joints for restricting lateral movement of the two parts of the housing; and
   (c) blind dado joints;

where one half of the housing has an integral insulating wall disposed to fit in a channel formed between the main body of the cell and the circuitry.

2. The two-part housing of claim 1, wherein the housing is made of materials selected from the group consisting of plastic, insulated metal, and rubber.

3. A two-part housing for a battery cell, wherein the two parts when joined have a mating region therebetween, having circuitry electrically connected to but physically separate from the cell, comprising:

(a) edge joints disposed in the mating region of the two halves of the housing, the edge joints having rabbeted edges;
   (b) finger joints for restricting lateral movement of the two parts of the housing; and
   (c) blind dado joints;

where both halves of the housing have an integral insulating wall disposed to fit in a channel formed between the main body of the cell and the circuitry.

4. The two-part housing of claim 3, wherein the housing is made of materials selected from the group consisting of plastic, insulated metal, and rubber.

* * * * *